(12) United States Patent
Tivnon

(10) Patent No.: US 11,225,088 B2
(45) Date of Patent: Jan. 18, 2022

(54) PRINTING DEVICE HOUSED WITHIN STAND OF DISPLAY

(71) Applicant: HEWLETT-PACKARD DEVELOPMENT COMPANY, L.P., Houston, TX (US)

(72) Inventor: Matthew William Tivnon, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 748 days.

(21) Appl. No.: 16/077,903

(22) PCT Filed: Jul. 14, 2017

(86) PCT No.: PCT/US2017/042070
§ 371 (c)(1),
(2) Date: Aug. 14, 2018

(87) PCT Pub. No.: WO2019/013809
PCT Pub. Date: Jan. 17, 2019

(65) Prior Publication Data
US 2021/0197580 A1 Jul. 1, 2021

(51) Int. Cl.
*B41J 3/44* (2006.01)
*B41J 11/70* (2006.01)

(52) U.S. Cl.
CPC ............... *B41J 3/445* (2013.01); *B41J 11/70* (2013.01)

(58) Field of Classification Search
CPC ......... B41J 3/445; B41J 11/70; G06Q 20/209; G07G 1/0018
USPC ................................. 347/101, 104, 108, 109
See application file for complete search history.

(56) References Cited

U.S. PATENT DOCUMENTS

| | | | |
|---|---|---|---|
| 6,042,007 A | 3/2000 | Nugent et al. | |
| 7,070,105 B2 | 7/2006 | Gatto et al. | |
| 7,433,185 B1 * | 10/2008 | Curran | F16M 11/22 361/679.41 |
| 7,611,237 B2 | 11/2009 | Silverbrook et al. | |
| 9,291,298 B2 | 3/2016 | Shin | |
| 2007/0212149 A1 | 9/2007 | Ota et al. | |
| 2009/0195793 A1 | 8/2009 | Silverbrook | |
| 2015/0149311 A1 | 5/2015 | Ward et al. | |
| 2016/0253646 A1 | 9/2016 | Shinmura et al. | |

FOREIGN PATENT DOCUMENTS

CN 203192105 U 9/2013

OTHER PUBLICATIONS

"POS-315(with Printer)—Salient Features", Datta Co., 2009, 4 Pages.

* cited by examiner

*Primary Examiner* — An H Do
(74) *Attorney, Agent, or Firm* — Tong Rea Bentley & Kim LLC

(57) ABSTRACT

In an example, a device includes a display, a stand, and a printing device. The stand is positioned beneath and supports the display, and has a cylindrical shape. The printing device is housed within the stand and includes a spindle, a roller, a fluid ejection die, and a cutting mechanism. The spindle supports a roll of paper. The roller unrolls the paper from the roll of paper. The fluid ejection die ejects fluid onto the paper as the paper unrolls from the roll of paper. The cutting mechanism severs a portion of the paper from the roll of paper.

13 Claims, 4 Drawing Sheets

PRINTING DEVICE HOUSED WITHIN STAND OF DISPLAY

BACKGROUND

A retail point of sale (POS) system is a computing system that facilitates the sale of goods and services to customers, such as a cash register. For instance, a POS system may include a processor, a display, a barcode scanner, a debit/credit card reader, a receipt printer, and/or other components. Typical operations of the POS system may include summing the costs of items purchased by a customer to calculate a total purchase price, accepting payment from and/or providing change to the customer for the purchase, and printing a receipt as proof of the purchase.

DETAILED DESCRIPTION

The present disclosure broadly describes a printing device that is housed within the stand of a display of a retail point of sale (POS) system. As discussed above, a retail POS system may include a processor, a display, a barcode scanner, a debit/credit card reader, a receipt printer, and/or other components. Each of these components may comprise a separate housing, which leads to wire clutter due to the number of connections that must be made between components. Moreover, the multiple components may consume a good deal of space that could otherwise be used to display merchandise or other higher-value items.

Examples of the present disclosure describe a receipt printer for a point of sale (POS) system that is vertically orientated (relative to display of the POS system) and housed within the column or stand of the POS system. By "vertically orientated," it is meant that the receipt printer is configured to house a roll of paper so that the roll sits or is supported on one end of its axis of rotation, and the paper is dispensed in a direction that is substantially parallel to a support surface of the POS system (or perpendicular to a longitudinal dimension of the stand).

In one example, the stand has a substantially cylindrical shape, where the cylinder has a circular cross section. The cylinder houses a paper roll such that the center of the cylinder and the center of the paper roll are non-concentric (i.e., their central axes are not common or collinear, but may be parallel). Components for unrolling the paper from the paper roll, for printing on the paper, and for cutting the paper from the paper roll are arranged inside the cylinder, along the circumference of the circular cross section (i.e., distanced from the central axis of the cylinder). A printed circuit board for the receipt printer may also be positioned vertically within the stand. The design of the receipt printer allows for a more compact POS system with less visible wire clutter.

Figure 1A:
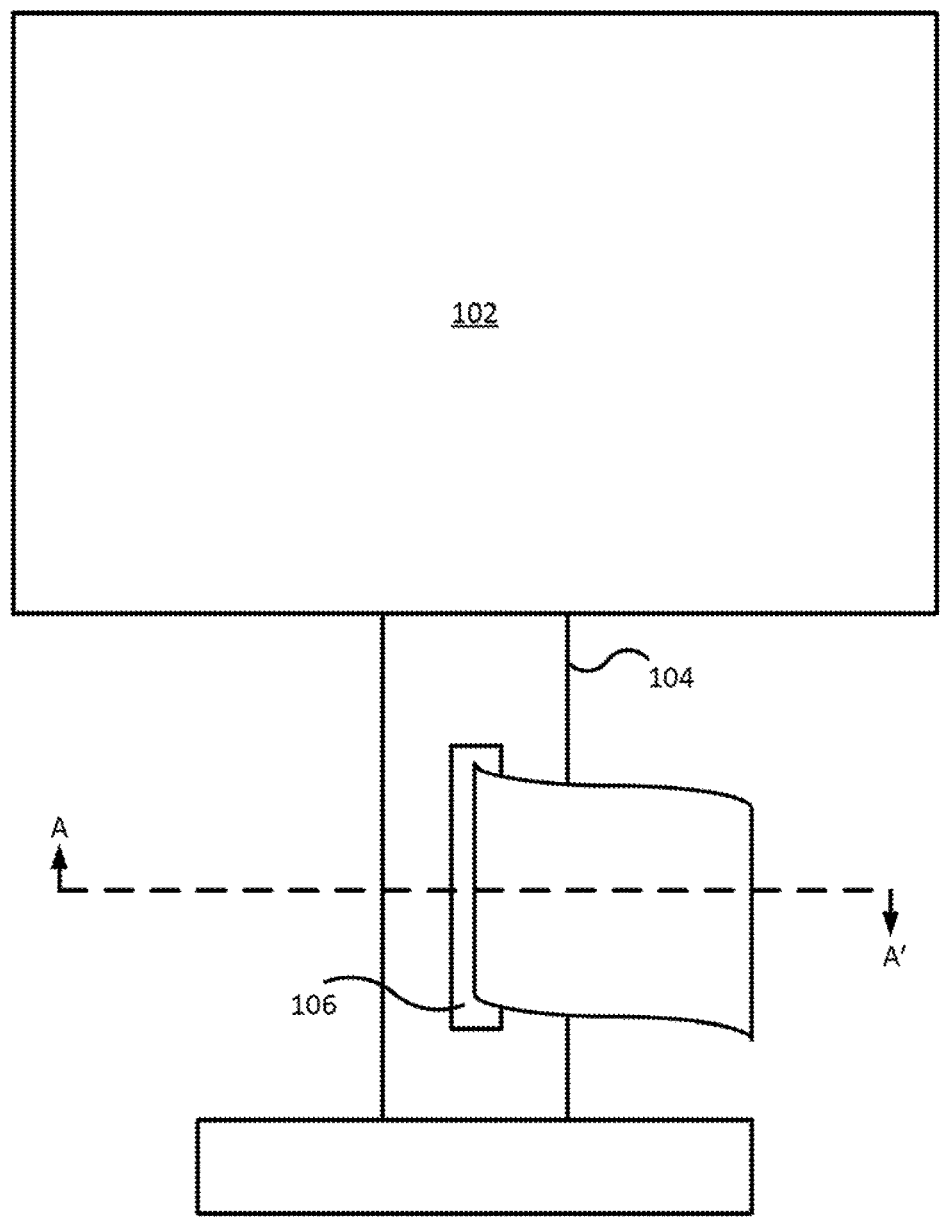
FIG. 1A depicts a high-level schematic diagram of an example point of sale system that includes a vertically orientated receipt printer.

FIG. 1A depicts a high-level schematic diagram of an example point of sale (POS) system 100 that includes a vertically orientated receipt printer. In one example, the POS system 100 includes at least a display 102, a stand 104, and a printing device 106. Those skilled in the art will realize that the POS system 100 has been simplified. For example, the POS system 100 may include other components such as a cash drawer, a transformer, and/or various peripherals (e.g., a mouse, a keypad, a credit card reader, a barcode scanner, etc.) that have been omitted from FIG. 1 for the sake of clarity.

The display 102 includes an output device (e.g., a monitor) for presenting information in visual form. In one example, the display 102 is an electronic display, such as a plasma display, a liquid crystal (LCD) display, a light emitting diode (LED) display, an organic LED (OLED) display, an electronic ink (e-ink) display, or another type of display. The display 102 may be a touch screen display, or it may be controlled by a user using a mouse, a touchpad, or another type of input device. The display 102 may be used, for example, to display information related to a customer purchase (e.g., names, item numbers, prices, and/or quantities of items purchased, form of payment given, change due, etc.).

As illustrated, the stand 104 may be positioned beneath the display 102 and may function as a support for the display 102. For instance, the stand 104 may support the display 102 in a spaced apart relation relative to a surface, such as a counter or tabletop. In another example, the stand 104, as well as the display 102, may be mounted to a wall. In one example, the stand 104 has a hollow, cylindrical shape with a substantially circular cross section, as better illustrated in FIG. 1B, which is a first cross sectional view of the example point of sale (POS) system 100 of FIG. 1A taken along line A-A' of FIG. 1A. Thus, the stand 104 provides a hollow, cylindrical housing for various components of the printing device 106, as described in further detail below.

In one example, the printing device 106 is housed within the stand 104, e.g., within the hollow, cylindrical interior volume of the stand 104. The printing device 106 is configured, for example, to print a receipt for a customer purchase.

Figure 1B:
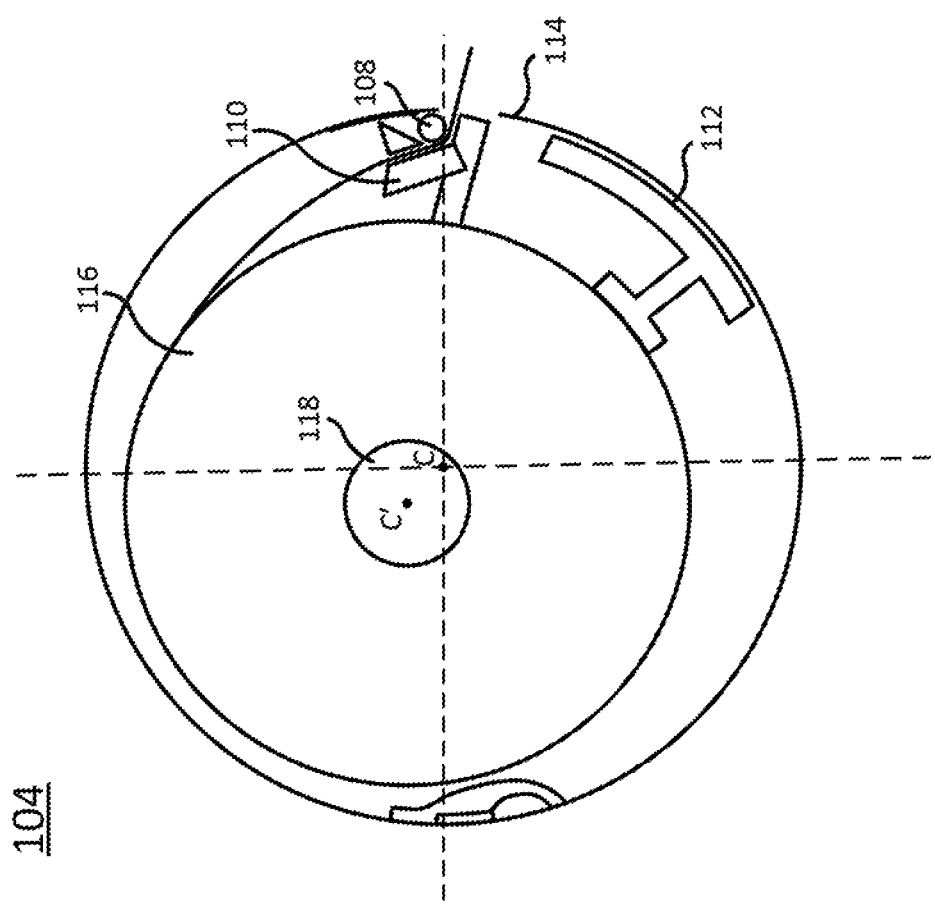
FIG. 1B is a first cross sectional view of the example point of sale system of FIG. 1A taken along line A-A' of FIG. 1A.
Figure 1B:
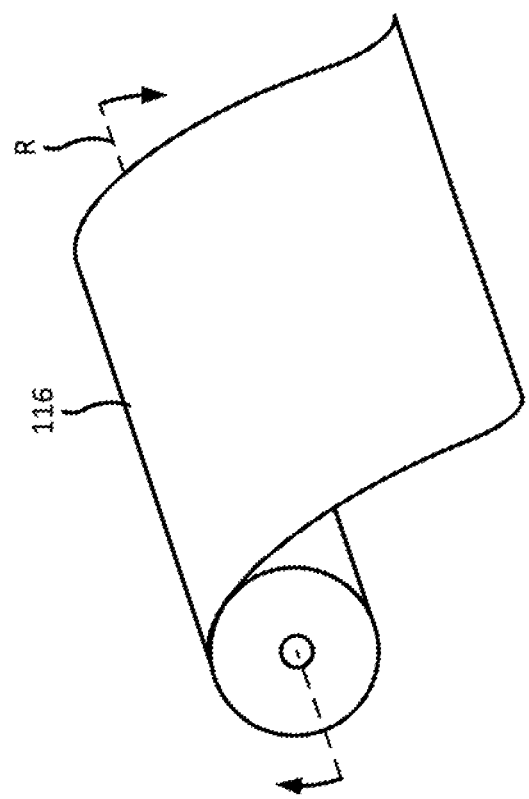
Figure 1C:
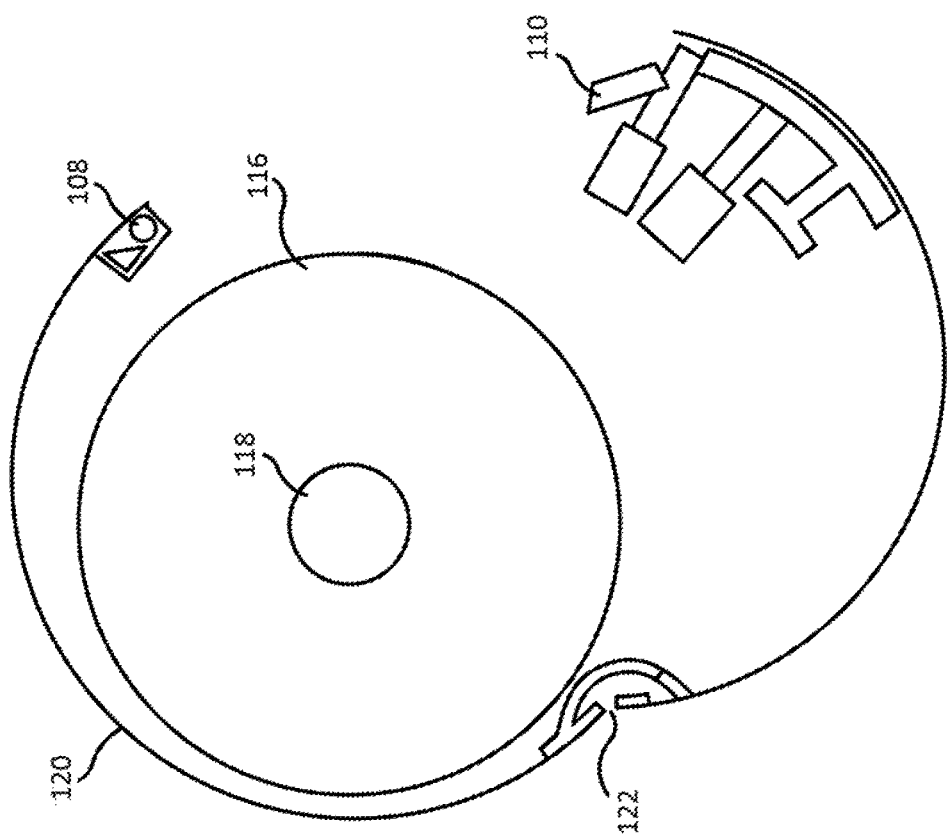
FIG. 1C is a second cross sectional view of the example point of sale system of FIG. 1A taken along line A-A' of FIG. 1A.

FIG. 1B illustrates the components of the printing device 106 in more detail. As illustrated, the printing device 106 includes a roller 108, a fluid ejection die 110, and a cutting mechanism 112. In one example, the roller 108, the fluid ejection die 110, and the cutting mechanism 112 are all positioned along the interior circumference of the stand 104.

In one example, the roller 108 is positioned near an outlet 114 that comprises an elongate opening in the stand 104. In one example, the roller 108 comprises a motor-driven circular, spherical, or cylindrical mechanism (e.g., a worm wheel) for unrolling paper from a paper roll that is positioned within the stand 104, such as paper roll 116. That is, rotation of the roller 108 pulls the paper from the paper roll 116 and urges the paper toward the outlet 114.

In one example, the fluid ejection die 110 is also positioned near the outlet 114, in proximity to the roller 108. The fluid ejection die 110 comprises a device for ejecting fluid onto the paper that is unrolled from the paper roll 116 before the paper exits the outlet 114. The ejected fluid may form an image including text, graphics, machine readable data (e.g., linear or matrix bar codes), or a combination thereof on the surface of the paper. In one example, the fluid ejection die 110 may comprise one or more print heads including one or more nozzles, and the ejected fluid may comprise ink, toner, a detailing agent, or the like.

In one example, the cutting mechanism 112 is also positioned near the outlet 114, e.g., on an opposite side of the outlet 114 from the roller 108 and fluid ejection die 110. The cutting mechanism 112 may comprise a motor-driven guillotine or blade that is moveable to sever a portion of the paper from the paper roll 116. In one example, cutting mechanism 112 has an arc shape that conforms to the inner circumference of the stand 104.

As shown in FIG. 1B, the paper roll 116 sits or is supported in a vertical orientation upon a spindle 118 inside the stand 104. That is, the paper roll 116 sits or is supported on one end of its axis of rotation R, and the paper is dispensed in a direction that is substantially parallel to a support surface of the POS system 100 as illustrated in FIG. 1A (or, the paper is dispensed in a direction that is substantially perpendicular to the longitudinal dimension of the stand 104).

The paper roll 116 may be positioned off-axis relative to a center C of the stand 104. That is, the spindle 118 on which the paper roll 116 sits or is supported is positioned so that an axis passing through the center C' of the spindle 118 is parallel to, but non-collinear with, an axis passing through the center C of the stand 104. This helps the printing device 106 maintain a compact form, while still allowing for components like the roller 108, the fluid ejection die 110, and the cutting mechanism 112 to be positioned along the interior circumference of the stand 104.

As shown in FIG. 10, which is a second cross sectional view of the example point of sale (POS) system 100 of FIG. 1A taken along line A-A' of FIG. 1A, the spindle 118 for supporting the paper roll 116 may be mounted on a door 120 of the stand 104, which may open via a hinge 122, such as a cabinet hinge. In addition, other components of the printing device 106, including the roller 108, may also be mounted on the door 120.

Figure 2:
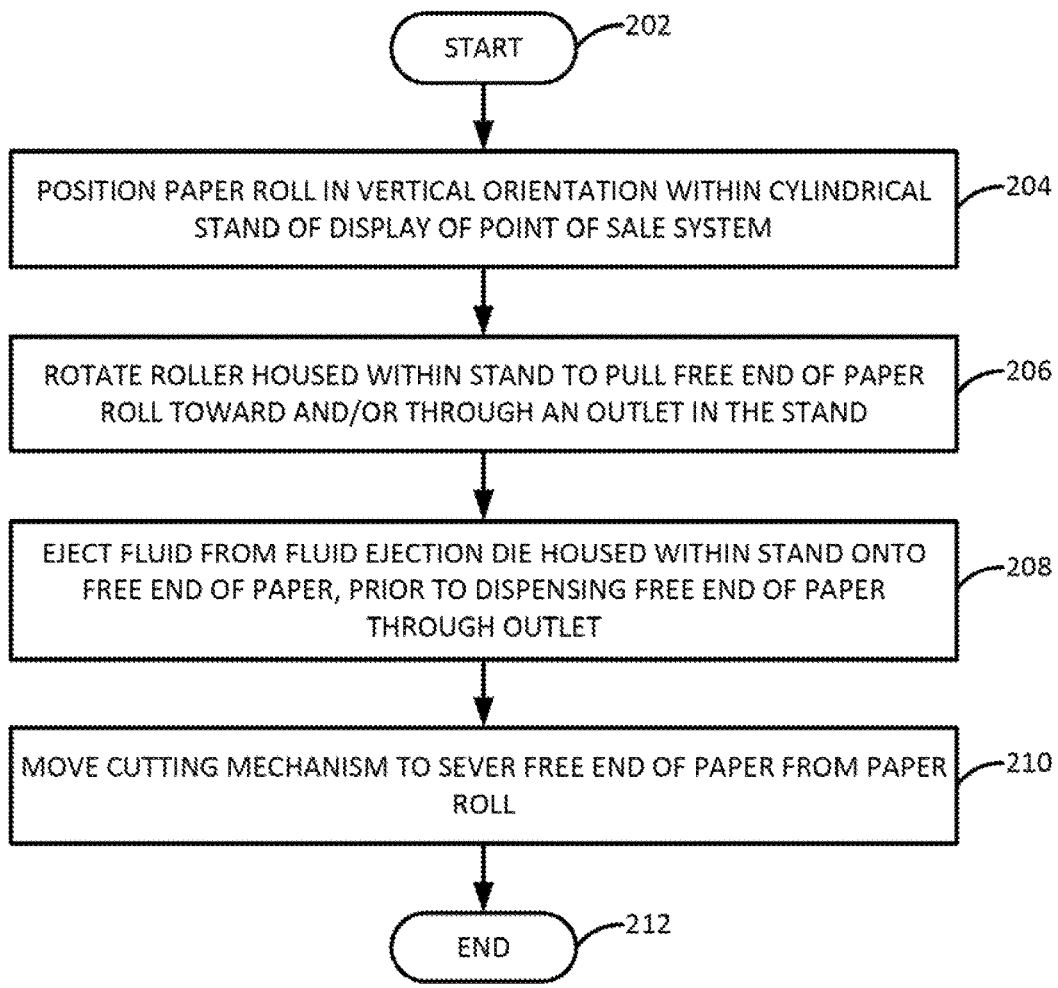
FIG. 2 illustrates a flow diagram of an example method for printing a receipt using a printing device housed within a stand of a display.

FIG. 2 illustrates a flow diagram of an example method 200 for printing a receipt using a printing device housed within a stand of a display. The method 200 may be performed, for example, by the retail POS system 100 illustrated in FIGS. 1A-1C. As such, reference may be made in the discussion of the method 200 to components of the POS system 100 of FIGS. 1A-1C. However, such references are made for the sake of example, and are not intended to be limiting.

The method 200 begins in block 202. In block 204, a paper roll is positioned, in a vertical orientation, within a cylindrical stand of a display of a retail point of sale (POS) system pulls. That is, the paper roll is positioned so that it sits or is supported on one end of its axis of rotation. The paper roll may be placed on a spindle that has a center through which a first axis passes, where the first axis is parallel to, but non-collinear with, a second axis passing through a center of the stand.

In block 206, a roller housed within the stand rotates, thereby pulling a free end of the paper roll toward and/or through an outlet in the stand. As the free end of the paper roll moves, the paper is dispensed through the outlet in a direction that is substantially parallel to a support surface of the POS system (or, the paper is dispensed in a direction that is substantially perpendicular to the longitudinal dimension of the stand).

In block 208, a fluid ejection die housed within the stand ejects fluid onto the paper as it moves past the fluid ejection die, but before it is dispensed through the outlet. The ejected fluid may form an image including text, graphics, and/or machine readable data on the paper.

In block 210, a cutting mechanism housed within the stand moves to sever the free end of the paper roll from the remainder of the paper roll (which is still housed within the stand). This allows the free end of the paper roll to be removed and, for example, handed to a customer.

The method 200 ends in block 212.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A device, comprising:
    a display;
    a stand positioned beneath and supporting the display, wherein the stand has a cylindrical shape; and
    a printing device housed within the stand, wherein the printing device includes:
        a spindle to support a roll of paper, wherein the spindle is positioned to support the roll of paper on one end of an axis of rotation of the roll of paper to cause the paper to unroll in a direction that is perpendicular to a longitudinal dimension of the stand;
        a roller to unroll the paper from the roll of paper;
        a fluid ejection die to eject fluid onto the paper as the paper unrolls from the roll of paper; and
        a cutting mechanism to sever a portion of the paper from the roll of paper.

2. The device of claim 1, wherein a first axis passing through a center of the spindle and a second axis passing through a center of the stand are non-collinear.

3. The device of claim 2, wherein the first axis is parallel to the second axis.

4. The device of claim 1, wherein the spindle is mounted on a door of the stand.

5. The device of claim 4, wherein the door opens via a cabinet hinge.

6. The device of claim 1, wherein the roller, the fluid ejection die, and the cutting mechanism are positioned along an inner circumference of the stand.

7. A device, comprising:
    a hollow, cylindrical housing;
    a printing device housed within the housing, wherein the printing device includes:
        a spindle to support a roll of paper in a vertical orientation, wherein the spindle is positioned to support the roll of paper on one end of an axis of rotation of the roll of paper to cause the paper to unroll in a direction that is perpendicular to a longitudinal dimension of the housing;
        a roller to unroll the paper from the roll of paper;
        a fluid ejection die to eject fluid onto the paper as the paper unrolls from the roll of paper; and
        a cutting mechanism to sever a portion of the paper from the roll of paper.

8. The device of claim 7, wherein a first axis passing through a center of the spindle and a second axis passing through a center of the stand are parallel and non-collinear.

9. The device of claim 7, wherein the spindle is mounted on a door of the housing.

10. The device of claim 7, wherein the roller, the fluid ejection die, and the cutting mechanism are positioned along an inner circumference of the stand.

11. A method, comprising:
positioning a roll of paper within a cylindrical housing, wherein the roll of paper sits on one end of an axis of rotation of the roll of paper, such that the paper unrolls in a direction that is perpendicular to a longitudinal dimension of the housing; and
printing an image on the free end of the roll of paper prior to dispensing the free end of the roll of paper through an outlet of the cylindrical housing.

12. The method of claim 11, wherein the printing comprises:
rotating a roller housed within the cylindrical housing so that a free end of the roll of paper is pulled toward an outlet of the cylindrical housing;
ejecting fluid onto the free end of the roll of paper before the free end of the roll of paper is dispensed through the outlet, via a fluid ejection die housed within the cylindrical housing; and
moving a cutting mechanism to sever the free end of the roll of paper from a remainder of the roll of paper.

13. The method of claim 12, wherein the roller, the fluid ejection die, and the cutting mechanism are positioned along an inner circumference of the cylindrical housing.

\* \* \* \* \*